(12) United States Patent
Wang et al.

(10) Patent No.: US 7,399,942 B2
(45) Date of Patent: Jul. 15, 2008

(54) METHOD FOR PROJECTION BONDING OF TELESCOPED TUBES

(75) Inventors: Pei-Chung Wang, Troy, MI (US); James F. Hengel, Romeo, MI (US); John D. Fickes, Brighton, MI (US); John F. Cantalin, Rochester Hills, MI (US); Timothy J. Roggenkamp, Brighton, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/326,882

(22) Filed: Jan. 6, 2006

(65) Prior Publication Data

US 2007/0158312 A1    Jul. 12, 2007

(51) Int. Cl.
    *B23K 11/14* (2006.01)
(52) U.S. Cl. .................... 219/93; 219/59.1; 219/92
(58) Field of Classification Search ............. 219/59.1, 219/61.1, 67, 91.21, 92, 93
    See application file for complete search history.

(56) References Cited

U.S. PATENT DOCUMENTS

| | | | | |
|---|---|---|---|---|
| 1,332,563 A | * | 3/1920 | Murray, Jr. et al. ............ 219/67 |
| 3,589,873 A | * | 6/1971 | Poth ........................... 428/600 |
| 3,909,045 A | * | 9/1975 | Meagher ....................... 285/22 |
| 6,290,082 B1 | * | 9/2001 | Van Giezen et al. ......... 220/23.91 |
| 6,654,995 B1 | * | 12/2003 | Wang et al. ................. 29/421.1 |
| 6,688,803 B2 | * | 2/2004 | Maria Van Giezen et al. .... 403/347 |
| 7,053,330 B2 | * | 5/2006 | Wang et al. .................... 219/93 |

* cited by examiner

*Primary Examiner*—Kevin P Kerns

(57) ABSTRACT

A pair of tubes are provided, one of greater diameter than the other so that the tubes can be telescoped together. An annular inward facing projection is formed on the outer tube for contact with the outside surface of the inner tube when the tubes are telescoped together. An annular outer facing projection is formed on the inner tube for contacting with the inside surface of the outer tube when the tubes are telescoped together. An adhesive is placed on one of the tubes for contacting with the other tube when the tubes are telescoped together. After the tubes are telescoped together weld current is conducted through the tubes to weld the annular projections to the respective opposing tube in contact therewith and at least partially cure the adhesive.

17 Claims, 3 Drawing Sheets

METHOD FOR PROJECTION BONDING OF TELESCOPED TUBES

FIELD OF THE INVENTION

The present invention relates to a method of attaching together a set of tubes, particularly a smaller size inner tube which is telescoped inside of a larger diameter outer tube.

BACKGROUND OF THE INVENTION

It is known in the automobile and other industries to construct an article such as a vehicle body using tubes that round, rectangular, or of other tubular cross section that are telescoped together and then attached by a bolting, welding, or other known methods. It would be desirable to provide a new and improved method for joining together a set of tubes.

SUMMARY OF THE INVENTION

According to the invention a set of tubes are provided, one of greater cross sectional dimension than the other so that the tubes can be telescoped together. An annular inward facing projection is formed on the outer tube for contact with the outside surface of the inner tube when the tubes are telescoped together. An annular outer facing projection is formed on the inner tube for contacting with the inside surface of the outer tube when the tubes are telescoped together. An adhesive sealer is placed on one of the tubes for contacting with the other tube when the tubes are telescoped together. After the tubes are telescoped together, weld current is conducted through the tubes to weld the annular projections to the respective opposing tube in contact therewith and at least partially cure the adhesive.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of certain exemplary embodiments is merely exemplary in nature and is in no way intended to limit the invention, its application, or uses.

Figure 1:
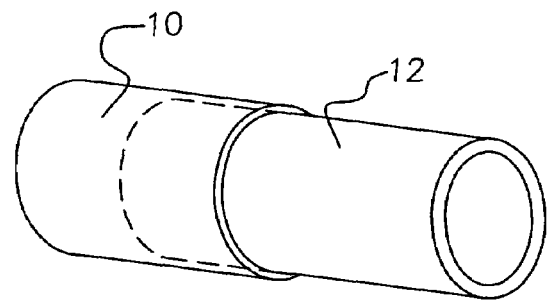
FIG. 1 is a perspective view showing an inner tube and an outer tube telescoped together.

Referring to FIG. 1 there is shown an outer tube 10 and an inner tube 12, which are telescoped together, either by inserting the smaller tube 12 into the outer tube 10, or by installing the outer tube 10 onto the inner tube 12.

Figure 2:
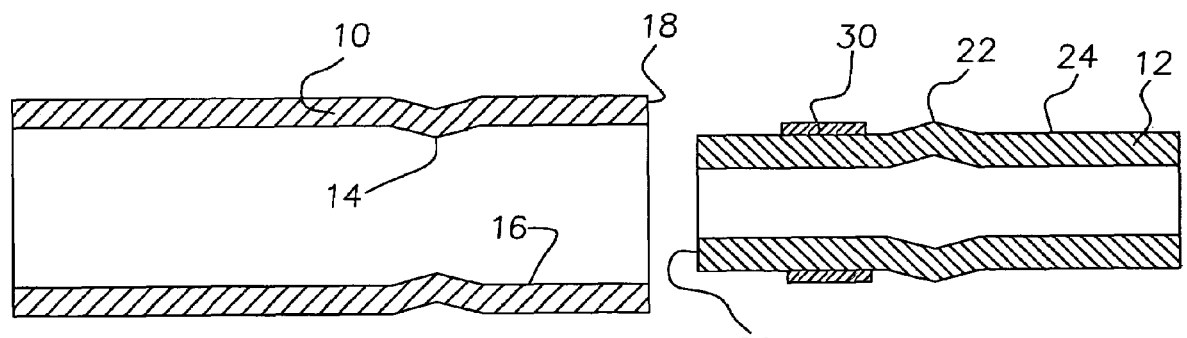
FIG. 2 shows the inner tube and the outer tube prior to being telescoped together, each having a projection formed thereon for contact with the other tube, and also showing an adhesive applied in an annular ring about the end of the inner tube.

Referring to FIG. 2 it is seen that the outer tube 10 has an annular inward facing projection 14 formed on the inner surface 16 at a distance from the end 18 thereof. This inward facing projection 14 can be formed using a known manufacturing technique, for example rolling the tube 10 against a forming die that bears upon the outer surface of the tube to displace the material of the tube 10 inwardly and thereby form the annular inward facing projection 14 thereon.

FIG. 2 also shows that the inner tube 12 has an annular outer facing projection 22 thereon which is formed on the outer surface 24 at a distance from the end 26 thereof, using any prior known forming process. For example, a mandrel may be inserted inside the tube 12 with dies that are expanded outwardly to force the displacement of the metal outwardly to thereby form the annular outer facing projection 22. FIG. 2 also shows that an annular bead or ring of adhesive 30 is applied onto the other surface of the inner tube 12.

Figure 3:
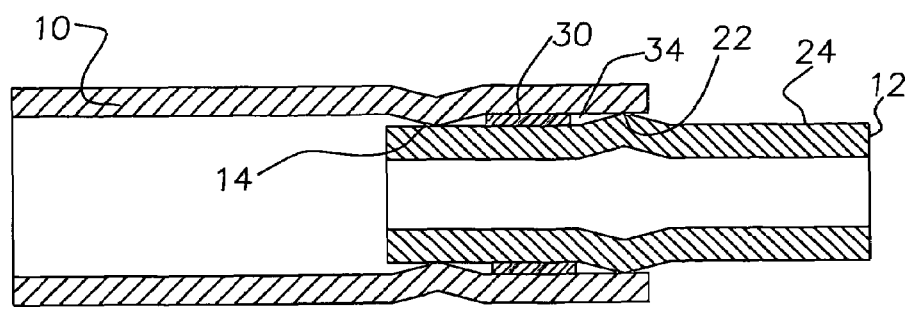
FIG. 3 shows the inner tube and the outer tube telescoped together.

Referring to FIG. 3 it is seen that the outer tube 10 and inner tube 12 have been telescoped together by inserting the inner tube 12 inside the outer tube 10. In particular it will be seen and appreciated that the inward facing projection 14 of the outer tube 10 is now in contact with the outer surface 24 of the inner tube 12. Likewise it is seen that the outer facing projection 22 of the inner tube 12 is now in contact with the inner surface 16 of the outer tube 10. Thus the annular projections cooperate to define a line of annular contact between the inner and outer tubes. As seen in FIG. 3, with the tubes telescoped together, there is a distance "X" between the inward facing projection 14 of the outer tube 10 and the outer facing projection 22 of the inner tube 12. Accordingly the tubes overlap each other by the distance "X" to thereby stiffen the connection between the tubes. Furthermore, it is seen and appreciated that because the outer diameter of the inner tube 12 is less than the inner diameter of the outer tube 10, a chamber 34 has been defined between the telescoped tubes 10 and 12 and is now occupied by the annular bead of adhesive 30 that had been applied onto the outer surface 24 of the inner tube 12. It is also seen in FIG. 3 that the bead of adhesive-sealer 30 has been applied at a length so that the chamber 34 is substantially filled with adhesive.

Figure 4:
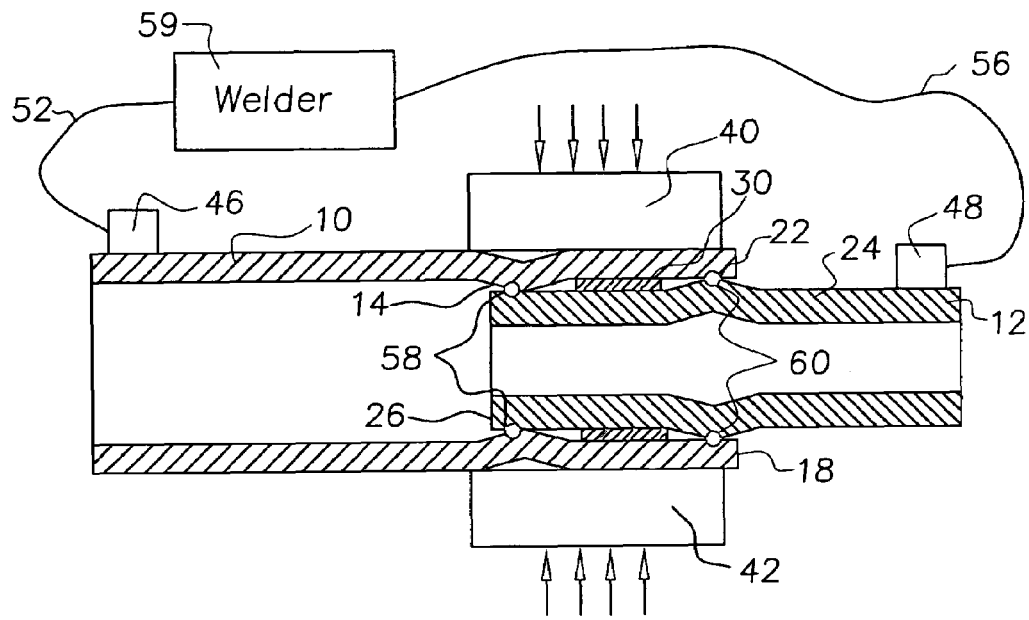
FIG. 4 shows a clamp applied to the outer tube and forcing the outer tube into contact with the inner tube, and weld electrodes applied to the inner tube and outer tube.
Figure 5:
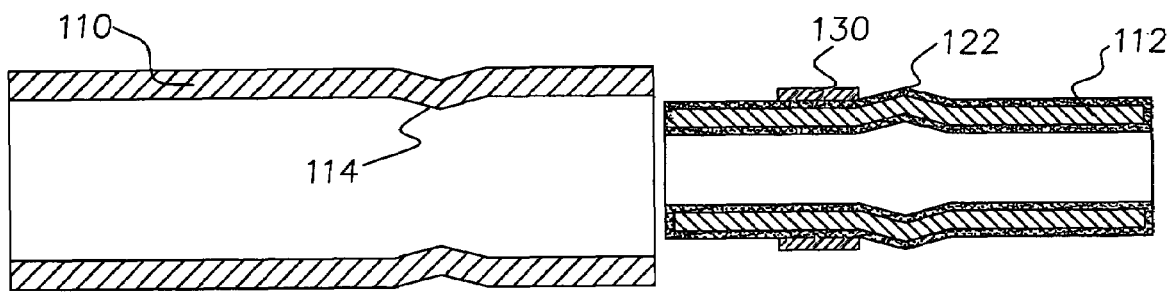
FIG. 5 shows a second embodiment of the tubes in which a brazing coating is applied to the inner tube.

Referring to FIG. 4 it is seen that an upper clamp 40 and a lower clamp 42 have been applied to the outside of the outer tube 10. The clamps 40 and 42 have a concave surface that is equal or less than the diameter of the outer tube to closely surround the outer tube 10 and prevent bulging. The clamps 40 and 42 are connected with an operating device such as a hydraulic cylinder, a pneumatic cylinder, electric motor, a mechanical hand operated mechanism, or the like, for forcing the clamps 40 and 42 against the outer tube 10 and thereby assuring that the outer tube 10 is pressed into contact with the inner tube 12. Thus the clamping force assures that the projections formed on the respective tubes are forced into contact with the opposing tube. It is to be understood and appreciated that a plurality of such clamps may be provided around the circumference of the outer tube 10 in order to optimize the clamping together of the tubes.

FIG. 4 also shows that an electrode assembly 46 is applied to the outer tube 10 and an electrode assembly 48 is applied to the inner tube 12. These electrodes 46 and 48 are connected by cables 52 and 56 to an electric welder 59. Weld current is applied to the electrodes 46 and 48 so that weld current passes between the outer tube 10 and the inner tube 12. This weld current is of a sufficient magnitude and duration to cause a projection resistance weld 58 to be formed between the inward facing projection 14 of the outer tube 10 and the outer surface 24 of the inner tube 12. Additional weld 60 is formed between the outer facing projection 22 of the inner tube 12 and the inner surface 16 of the outer tube 10. It will be understood and appreciated that these projection welds 58 and 60 each extend fully around the circumference of the tubes. It is also understood that the heating of the tubes 10 and 12 during the formation of the welds 58 and 60 will heat the metal adjacent the adhesive ring 30 and cause the adhesive to be at least partially cured. In addition, the adhesive ring 30 will be further cured when the vehicle body passes through a paint curing oven. Thus the adhesive ring 30 acts to provide an additional and supplemental attachment between the outer tube 10 and the inner tube 12 and also serves to assure a water tight seal between the tubes in the event of any void that might occur in the projection weld 58 or 60. It will be understood that the height of the annular projections determines the thickness of the adhesive ring 30, and is preferably in the range of 0.2-2 millimeters as this thickness of adhesive provides the needed level of adhesive bonding and sealing between the tubes.

Figure 6:
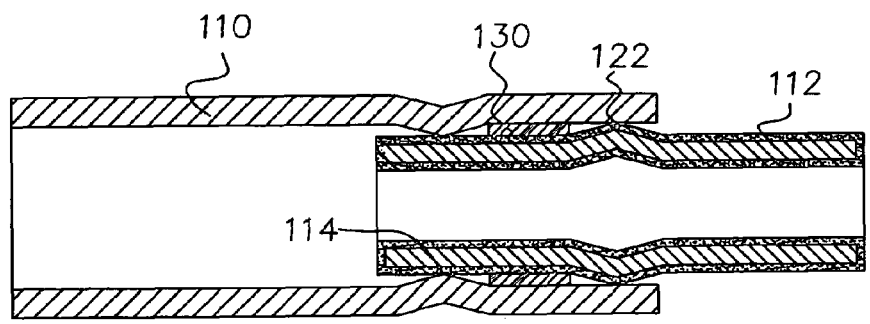
FIG. 6 shows the coated inner tube and the outer tube of FIG. 5 telescoped together.

Referring now to FIG. 6 another embodiment of the invention is shown in which the outer tube 110 is manufactured of an aluminum material, and the inner tube 112 is a steel material. An inward facing projection 114 is formed on the outer tube 110 an outward facing projection 122 is formed on the inner tube 112. Furthermore, the inner tube 112 is coated with a suitable coating material that is selected from those commercially available brazing materials that will be appropriate to braze together the particular dissimilar materials of the outer tube 110 and the inner tube 112. For example, in the case of attaching an aluminum tube to a steel tube, the brazing material may be a nickel or $BAlSi_4$ material that is plated or otherwise suitably deposited onto the steel inner tube 112. An annulus or ring of adhesive-sealer 130 is also applied onto the outside of the inner tube 112, overtop the brazing coating.

As seen in FIG. 6 the outer tube 110 and inner tube 112 are telescoped together. Although not shown in FIG. 6, the clamps and electrodes would be applied as in FIG. 4 in order to clamp the tubes together and apply a weld current to the tubes. Upon application of the weld current, the projections are brazed to the opposing tube by virtue of the melting of the brazing material. In addition the heat generated during the brazing process will at least partially cure the adhesive 130. It will be understood and appreciated that the presence of the adhesive bead 130 will serve to assist in attaching together the two tubes, and also will assist in isolating the dissimilar metals of the outer tube 110 and inner tube 112 to prevent the occurrence of galvanic corrosion between the tubes.

Figure 7:
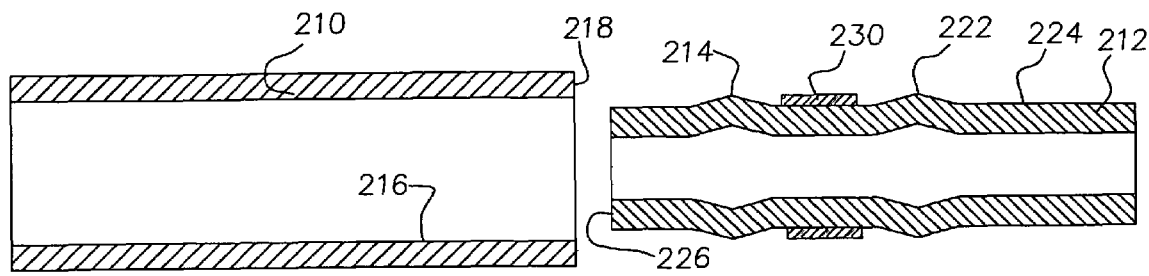
FIG. 7 shows another embodiment of the invention in which spaced apart projections are provided on the inner tube.

FIG. 7 shows another embodiment of the invention in which the inner tube 212 has an annular outer facing projection 214 and an annular outer facing projection 222 formed in spaced apart relation on the outer surface 224 at a distance from the end 226 thereof. FIG. 7 also shows that an annular bead or ring of adhesive 230 is applied onto the outer surface 224 of the inner tube 12 between the projections 214 and 222. Outer tube 210 has an end 218 and an inner surface 216.

Figure 8:
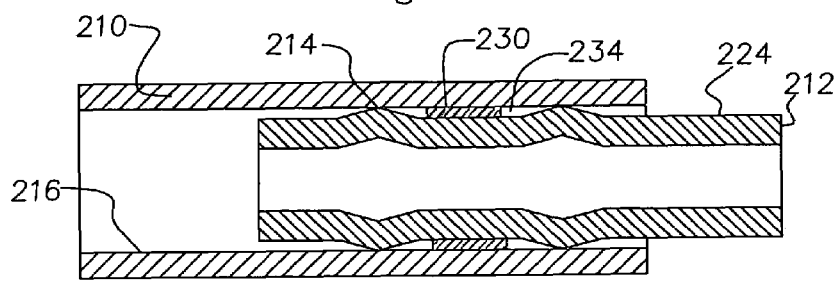
FIG. 8 shows the tubes of FIG. 7 telescoped together.

Referring to FIG. 8 it is seen that the outer tube 210 and inner tube 212 have been telescoped together by inserting the inner tube 212 inside the outer tube 210. Chamber 234 is defined between the projections and seats adhesive 230. In particular it will be seen and appreciated that the outer facing projections 214 and 222 of the inner tube 212 is now in contact with the inner surface 216 of the outer tube 210, and ready for the application of weld current to join the tubes together as in FIG. 4.

Figure 9:
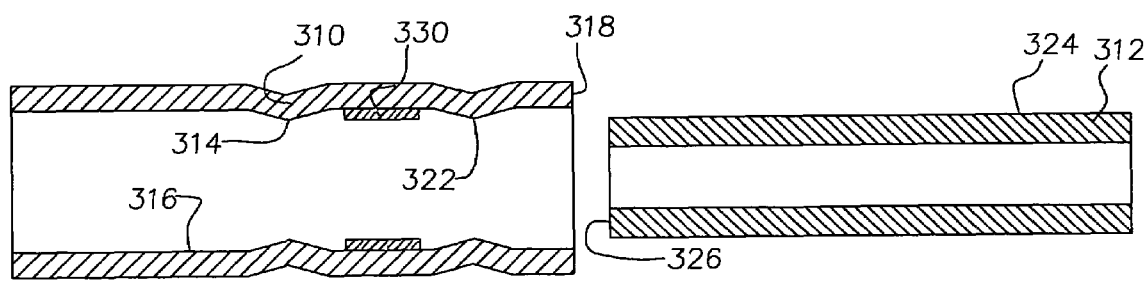
FIG. 9 shows another embodiment of the invention in which spaced apart projections are provided on the outer tube.

FIG. 9 shows another embodiment of the invention in which the outer tube 310 has an annular inner facing projection 314 and an annular inner facing projection 322 formed in spaced apart relation on the inner surface 316 at a distance from the end 318 thereof FIG. 9 also shows that an annular bead or ring of adhesive 330 is applied onto the inner surface 330 of the outer tube 310 between the projections 314 and 322. Inner tube 312 has outer surface 324 and an end 326.

Figure 10:
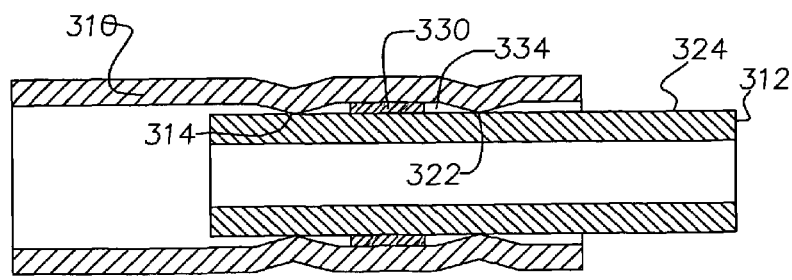
FIG. 10 shows the tubes of FIG. 9 telescoped together.

Referring to FIG. 10 it is seen that the outer lube 310 and inner tube 312 have been telescoped together by inserting the end 326 of the inner tube 312 inside the end 318 of the outer tube 310. In particular it will be seen and appreciated that the inner facing projections 314 and 322 of the outer tube 310 is now in contact with the outer surface 324 of the inner tube 312, thereby forming a chamber 334 in which the adhesive 330 is contained, and ready for the application of weld current to join the tubes together as in FIG. 4.

The foregoing description of the invention is merely exemplary in nature and, thus, variations thereof are intended to be within the scope of the invention.

For example, although the drawings shown herein have the adhesive applied onto the outer diameter of the inner tube, the adhesive may alternatively be applied onto the inner diameter of the outer tube. In addition it will be understood that the adhesive can be dispensed using any available adhesive technology, for example by dispensing liquid adhesive onto the surface to form an annular ring, or by preforming the adhesive into an annular band which can be inserted in or onto the tube. Alternatively the adhesive may be in the form of a tape or other solid material which is applied onto the surface of the tube.

It will be understood that the clamps for clamping the tubes may not be needed. For example, by closely controlling the dimensions of the tubes and their respective projections they may be fitted together with a light interference fit therebetween which assures proper contact for the welding operation without the application of a separate clamping force onto the tubes.

Furthermore, although the drawings show the example of round tubes that are telescoped together, it is also the case that square, rectangular, or other shape tubes can be telescoped together and the present invention may be employed irrespective of the shape of the tube. Furthermore, in the case of tubes other than round tubes, it may not be desirable or necessary to have the projections extend continuously around the circumference of the tube. For example, in the case of a square tube, the projections may be formed to extend from the flat side walls of the tubes, and no projection will be provided at the corner of the tube.

It will be understood and appreciated that a wide range of adhesives are commercially available including adhesives that cure at room temperature or elevated temperature, and may find useful application in the designs of the present invention. If the invention is to be employed in the manufacture of motor vehicles, it is useful to use an adhesive that reaches its full strength after the motor vehicle is heated in the paint drying ovens.

What is claimed is:

1. A method attaching together an inner tube and an outer tube that are telescoped together, comprising:
    forming an annular inward facing projection on the outer tube for contacting with the outside of the inner tube when the tubes are telescoped together;
    forming an annular outer facing projection on the inner tube for contacting with the inside of the outer tube when the tubes are telescoped together;
    placing adhesive-sealer on one of the tubes for contacting with the other tube when the tubes are telescoped together;
    conducting weld current through the telescoped together tubes;
    and the tubes are of dissimilar metal, and a brazing material is plated onto one of the tubes and the weld current conducted to the tubes causes the projections to be brazed to the respective tube in contact therewith.

2. The method of claim 1 in which the weld current heats the adhesive-sealer and thereby provides an adhesive bond between the tubes.

3. The method of claim 1 in which the weld current heats the adhesive-sealer to partially cure the adhesive-sealer, and then the telescoped tubes are thereafter heated in an oven to further cure the adhesive-sealer so that the telescoped tubes are attached together by both brazing of the projections to the opposing tube and also adhesive bonding of the tubes.

4. The method of claim 1 in which the adhesive-sealer is placed in an annulus around the inner tube and extends to a sufficient length along the inner tube so that when the tubes are telescoped together, the adhesive extends substantially the full distance between the inner facing projection of the outer tube and the outer facing projection of the inner tube.

5. The method of claim 1 in which the projections formed on the tube are formed thereon at a sufficient length from the end thereof that upon the tubes being telescoped together to the desired extent, an annular chamber is formed between the inner and outer tubes and their respective projections, and the adhesive-sealer is placed on the one tube to a dimension such that the adhesive-sealer substantially fills the annular chamber when the tubes are telescoped together to the desired extent.

6. The method of claim 1 in which resistance weld current is applied by positioning of weld electrodes against the inner and outer tubes.

7. The method of claim 1 in which a clamping force is applied to the outer tube to clamp the outer tube to the inner tube and thereby assure contact of the respective projections with the opposed tubes prior to the application of resistance weld current to the tubes.

8. The method of claim 1 in which the annular projection extends continuously around the circumference of one or both of the tubes.

9. A method for attaching together telescoped inner and outer tubes, comprising:
    forming an annular inward facing projection on the outer tube at a distance from the end thereof;
    forming an annular outer facing projection on the inner tube at a distance from the end thereof;
    placing adhesive-sealer on one of the tubes between the projection and the end of the tube;
    telescoping the tubes together with the inner tube inside the outer tube at least to a distance where the inward facing projection of the outer tube contacts with the outside surface of the inner tube, the outer facing projection of the inner tube contacts with the inside surface of the outer tube, and the adhesive-sealer is located between the respective projections of the tubes;
    and placing a first electrode against the inner tube and a second electrode against the outer tube and conducting weld current between the electrodes whereby the projection of each tube is resistance welded to the other tube and the tubes are heated to at least partially cure the adhesive-sealer and create an adhesive bond between the inner and outer tubes.

10. The method of claim 9 in which upon telescoping together of the tubes an annular chamber is formed between the inward facing projection of the outer tube and outer facing projection of the inner tube, and the adhesive-sealer substantially fills the chamber.

11. The method of claim in 10 which the adhesive-sealer is placed on the outer surface of the inner tube prior to telescoping together of the tubes.

12. A method for attaching together telescoped inner and outer tubes of dissimilar metal, comprising:
    forming an annular inward facing projection on the outer tube at a distance from the end thereof;
    forming an annular outer facing projection on the inner tube at a distance from the end thereof;
    placing adhesive-sealer on one of the tubes between the projection and the end of the tube;
    coating one of the tubes with a brazing compound;
    telescoping the tubes together with the inner tube inside the outer tube at least to a distance where the inward facing projection of the outer tube contacts with the outside surface of the inner tube, the outer facing projection of the inner tube contacts with the inside surface of the outer tube, and the adhesive-sealer is located between the respective projections of the tubes;
    and placing a first electrode against the inner tube and a second electrode against the outer tube and conducting weld current between the electrodes whereby the projection of each tube is brazed to the other tube and the tubes are heated to at least partially cure the adhesive and create an adhesive bond between the inner and outer tubes.

13. A method of attaching together an inner tube and an outer tube that are telescoped together, comprising:
    providing inner and outer tubes, each being of constant dimension and untapered;
    providing between the inner and outer tubes a chamber defined by first and second annular projections formed on at least one of the tubes, each of said annular projections projecting from the surface of the at least one tube and toward the opposite surface of the other tube, the projections being spaced apart from one another when the tubes are telescoped together and the projections each providing an annular line of contact between the inner and outer tubes;
    placing adhesive-sealer on one of the tubes so that upon telescoping together of the tubes the adhesive sealer will be located in the chamber between the first and second annular projections;
    and conducting weld current through the telescoped together tubes to resistance weld together the tubes at the line of annular contact between the inner and outer tubes and at least partly cure the adhesive-sealer to bond and seal the tube together.

14. The method of claim 13 in which both the first and second annular projections are formed on the same tube.

15. The method of claim 13 in which one of the annular projections is formed on the inner tube and the other of the annular projections is formed on the outer tube.

16. The method of claim 13 in which both the first and second annular projections are formed on the inner tube and project outwardly toward the outer tube to contact with the outer tube.

17. The method of claim 13 in which both the first and second annular projections are formed on the outer tube and project inwardly toward the inner tube to contact with the inner tube.

\* \* \* \* \*